US010391432B2

(12) United States Patent
Biltoft et al.

(10) Patent No.: US 10,391,432 B2
(45) Date of Patent: Aug. 27, 2019

(54) MANIFOLD ARRANGEMENT

(71) Applicant: Evoqua Water Technologies LLC, Warredale, PA (US)

(72) Inventors: Bruce Gregory Biltoft, Chatsworth (AU); Michael Collignon, Annagrove (AU); Robert James McMahon, Leichardt (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 129 days.

(21) Appl. No.: 15/428,226

(22) Filed: Feb. 9, 2017

(65) Prior Publication Data

US 2017/0151533 A1   Jun. 1, 2017

Related U.S. Application Data

(62) Division of application No. 14/347,258, filed as application No. PCT/US2012/055715 on Sep. 17, 2012, now Pat. No. 9,604,166.

(30) Foreign Application Priority Data

Sep. 30, 2011   (AU) ................................ 2011904047

(51) Int. Cl.
*B01D 35/34* (2006.01)
*B01D 63/04* (2006.01)
(Continued)

(52) U.S. Cl.
CPC ............. *B01D 35/34* (2013.01); *B01D 61/18* (2013.01); *B01D 63/046* (2013.01); *C02F 1/444* (2013.01);
(Continued)

(58) Field of Classification Search
None
See application file for complete search history.

(56) References Cited

U.S. PATENT DOCUMENTS 256,008 A    4/1882  Leak
285,321 A    9/1883  Tams
(Continued)

FOREIGN PATENT DOCUMENTS

AU    34400/84 A    4/1985
AU    55847/86 A    9/1986
(Continued)

OTHER PUBLICATIONS

Almulla et al., "Developments in high recovery brackish water desalination plants as part of the solution to water quantity problems," Desalination, 153 (2002), pp. 237-243.
(Continued)

*Primary Examiner* — Benjamin M Kurtz

(57) ABSTRACT

Provided is an improved filtration module assembly comprising a vessel having a filtration cartridge disposed within it and a header coupled to an end of the vessel, the header including a housing having an open-ended upper end and a lower end, and an end cap including a portion that mates with a complimentary structure defined by the inner all of the open ended upper end of the housing to removable engage with the housing and the end cap may further define a passageway for fluid to flow out of the vessel. The filtration module assembly may enable an improved manifold arrangement used to communicate fluids to and from a filtration system comprising a plurality of such modules and the configurations of the present invention may facilitate improved operation of such filtration systems.

13 Claims, 13 Drawing Sheets

(51) Int. Cl.
*C02F 1/44* (2006.01)
*B01D 61/18* (2006.01)

(52) U.S. Cl.
CPC ...... *B01D 2313/06* (2013.01); *B01D 2313/18* (2013.01); *B01D 2315/08* (2013.01); *B01D 2315/12* (2013.01); *B01D 2317/04* (2013.01)

(56) References Cited

U.S. PATENT DOCUMENTS

| | | |
|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |

(56) References Cited

U.S. PATENT DOCUMENTS

| | | |
|---|---|---|
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Eftenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |

(56) References Cited

U.S. PATENT DOCUMENTS

| | | |
|---|---|---|
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,891,334 A | 4/1999 | Gundrum et al. |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |

(56) References Cited

U.S. PATENT DOCUMENTS

| | | |
|---|---|---|
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,540,957 B1 | 6/2009 | Kurth et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038075 A1* | 2/2003 | Akimoto ............... B01D 63/021 210/321.79 |
| 2003/0038080 A1 | 2/2003 | Vriens |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196947 A1 | 10/2003 | Gundrum et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178136 A1 | 9/2004 | Taniguchi et al. |
| 2004/0178154 A1 | 9/2004 | Zha et al. |
| 2004/0188339 A1 | 9/2004 | Murkute et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0092674 A1 | 5/2005 | Mahendran et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |

(56) References Cited

U.S. PATENT DOCUMENTS

| | | |
|---|---|---|
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0124529 A1* | 6/2006 | Schott ............... B01D 53/225 210/321.6 |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1 | 5/2007 | Cote et al. |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0210623 A1 | 9/2008 | McMahon et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898Y Y | 8/1995 |
| CN | 2236049Y Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 9/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |

(56) References Cited

FOREIGN PATENT DOCUMENTS

| | | |
|---|---|---|
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |

(56) References Cited

FOREIGN PATENT DOCUMENTS

| | | |
|---|---|---|
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 200237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 1001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002113333 A | 4/2002 |
| JP | 2002143849 A | 5/2002 |
| JP | 2002177746 A | 6/2002 |
| JP | 3302992 B2 | 7/2002 |
| JP | 2002525197 T | 8/2002 |
| JP | 2002527229 A | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 T | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 216773 B | 12/1993 |
| TW | 347343 | 12/1998 |
| WO | 1985001449 A1 | 4/1985 |
| WO | 1986005116 A1 | 9/1986 |
| WO | 1986005705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9116124 A1 | 10/1991 |
| WO | 9104783 A1 | 4/1992 |
| WO | 9302779 A1 | 2/1993 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 199908773 A1 | 2/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 0030740 A1 | 6/2000 |
| WO | 200030742 A1 | 6/2000 |
| WO | 200100307 A2 | 1/2001 |

(56) References Cited

FOREIGN PATENT DOCUMENTS

| WO | 200105715 A1 | 1/2001 |
|---|---|---|
| WO | 0108790 A1 | 2/2001 |
| WO | 200119414 A1 | 3/2001 |
| WO | 200132299 A1 | 5/2001 |
| WO | 200136075 A1 | 5/2001 |
| WO | 0143856 A1 | 6/2001 |
| WO | 200145829 A1 | 6/2001 |
| WO | 0211867 A2 | 2/2002 |
| WO | 0230550 A1 | 4/2002 |
| WO | 200226363 A2 | 4/2002 |
| WO | 0238256 A1 | 5/2002 |
| WO | 2002040140 A1 | 5/2002 |
| WO | 2002047800 A1 | 6/2002 |
| WO | 2003000389 A2 | 1/2003 |
| WO | 03013706 A1 | 2/2003 |
| WO | 2003013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2011049441 A1 | 4/2011 |

OTHER PUBLICATIONS

Anonymous, "Nonwoven Constructions of Dyneon™ THV and Dyneon™ HTE Fluorothermoplastics", Research Disclosure Journal, Apr. 1999, RD 420013, 2 pages.
Australian Patent Examination Report No. 1 dated Jul. 2, 2014 for Application No. 2013200833.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., "Neural networks for long term prediction of fouling and backwash efficiency in ultrafiltration for drinking water production," Desalination 131 (2000) pp. 353-362.
Dow Chemical Company, "Filmtec Membranes—Cleaning Procedures for Filmtec FT30 Elements," Tech Facts, Online, Jun. 30, 2000, XP002237568.
EPA, Membrane Filtration Guidance Manual, Nov. 2005.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999, Chapters 2 and 5.
Judd, "The MBR Book: Principles and Applications of Membrane Bioreactors in Water and Wastewater Treatment," (2006), pp. 174-178.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.
MicroC™-Carbon Source for Wastewater Denitrification. Information from Environmental Operating Solutions website including MSDS.
Miller et al., "Side Stream Air Lift MBR Development and Successful Application of a New Generation of MBR," Pollution Solutions Brochure, NORIT, The Netherlands, Apr. 2008.
Nakayama, "Introduction to Fluid Mechanics," Butterworth-Heinemann, Oxford, UK, 2000.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
Schematic of 4 Geyser Pump, Geyser Pump Tech. Co., Nov. 13, 2005.
Supplementary European Search Report dated May 21, 2015 for Application No. 12835621.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.

(56) References Cited

OTHER PUBLICATIONS

Water Encyclopedia, edited by Jay Lehr, published by John Wiley & Sons, Inc., Hoboken, New Jersey, 2005. Available at http://wwwmmrw.interscience.wiley.com/eow/.
White et al., "Optimisation of intermittently operated microfiltration processes," The Chemical Engineering Journal, 52 (1993), pp. 73-77.
Wikipedia, "Seawater," available at http://en.wikipedia.org/wiki/Seawater, Jul. 15, 2007.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.
Zenon, "Proposal for ZeeWeed® Membrane Filtration Equipment System for the City of Westminster, Colorado, Proposal No. 479-99," Mar. 2000, entire publication.

* cited by examiner

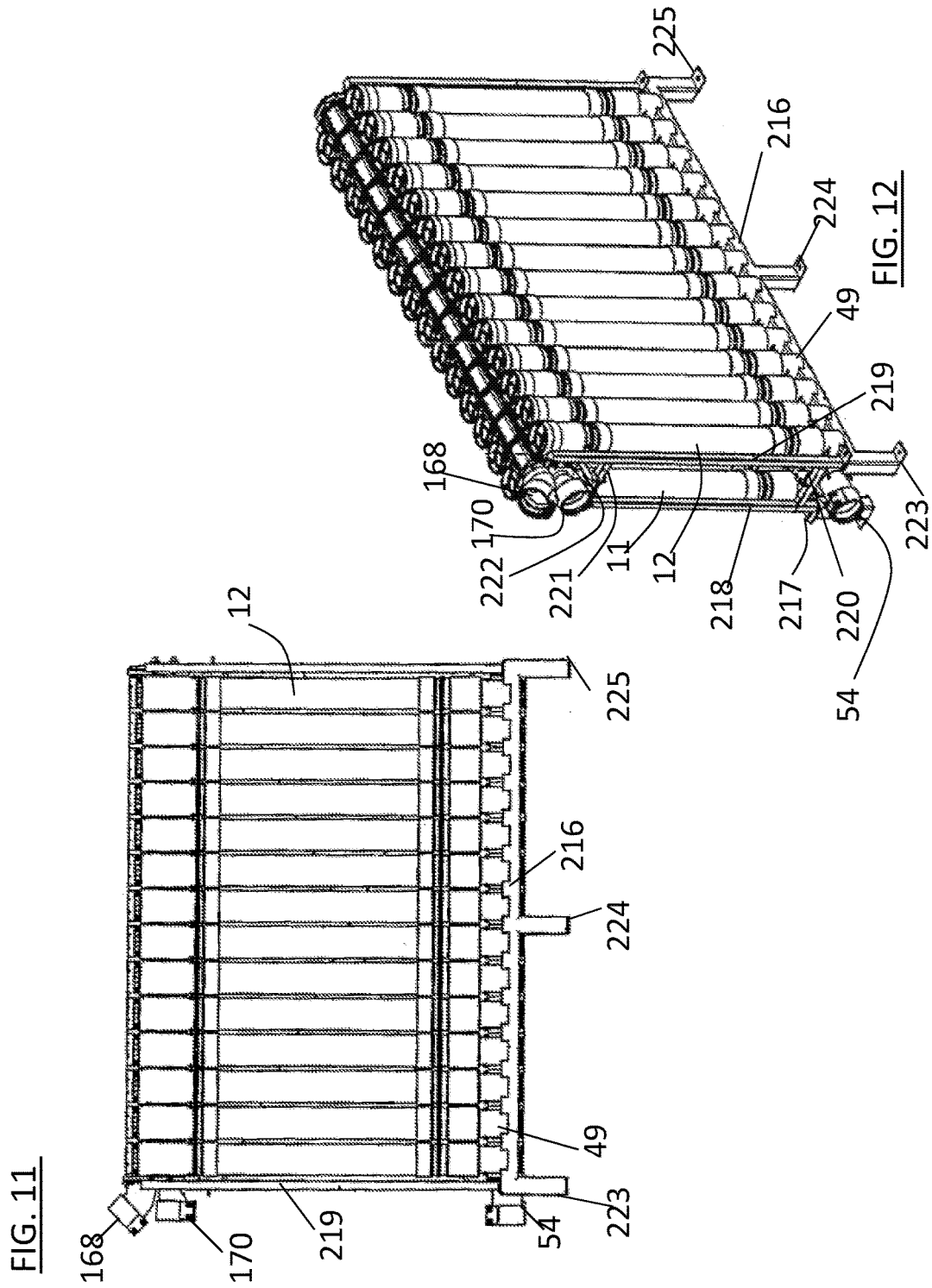

MANIFOLD ARRANGEMENT

CROSS-REFERENCE TO RELATED APPLICATIONS

This application is a divisional application of and claims the benefit under 35 U.S.C. § 120 to co-pending U.S. patent application Ser. No. 14/347,258, titled IMPROVED MANIFOLD ARRANGEMENT, filed on Mar. 26, 2014, which is a national stage application under 35 U.S.C. § 271 of International Application No. PCT/US2012/055715, titled IMPROVED MANIFOLD ARRANGEMENT, filed on Sep. 17, 2012, each of which is incorporated herein by reference in its entirety for all purposes.

BACKGROUND

Aspects and embodiments of the present invention relate to membrane filtration systems and, more particularly, to manifold arrangements used to communicate fluids to and from a plurality of filtration modules.

SUMMARY

In accordance with an aspect of the present invention, there is provided a filtration module assembly comprising a vessel and a header coupled to an end of the vessel. The header includes a housing having an open-ended upper end and a lower end. The filtration module assembly further comprises an end cap including a portion that mates with a complimentary structure defined by the inner wall of the open-ended upper end of the housing to removably engage with the housing and the end cap defines a passageway for fluid to flow out of the vessel. A filtration cartridge disposed within the vessel includes an upper end removably coupled to the lower end of the housing.

In accordance with some embodiments, the filtration cartridge comprises a plurality of permeable hollow fiber membranes extending between the lower end of the filtration cartridge and the upper end of the filtration cartridge.

In accordance with some embodiments, the vessel comprises a screen extending between the lower end of the filtration cartridge and the upper end of the filtration cartridge and surrounding the plurality of permeable hollow fiber membranes.

In accordance with some embodiments, the module assembly further comprises a filtrate collection chamber defined by the end cap and the upper end of the filtration cartridge.

In accordance with some embodiments, the passageway includes a filtrate communication passageway in fluid communication between the filtrate collection chamber and a first fluid transfer manifold.

In accordance with some embodiments, the end cap further comprises a shut off valve constructed and arranged to fluidly isolate the filtrate collection chamber from a filtrate communication port.

In accordance with some embodiments, the first fluid transfer manifold is coupled to the header and includes a filtrate passageway and is further coupled to a second fluid transfer manifold of a second module assembly to provide fluid communication between the filtrate passageway of the first fluid transfer manifold and a filtrate passageway of the second fluid transfer manifold.

In accordance with some embodiments, the passageway includes a filtrate communication passageway defined by a side surface of the end cap and an internal surface of the housing.

In accordance with some embodiments, the filtration cartridge includes an external diameter smaller than an internal diameter of the housing.

In accordance with some embodiments, the filtration cartridge includes fluid communication openings defined in a potting sleeve surrounding a portion of the membranes, the fluid communication openings in fluid communication between a feed passageway in the housing and outer surfaces of the membranes.

In accordance with some embodiments, the removable end cap includes screw threads configured to engage with mating screw threads provided on an upper portion of an inner wall of the housing.

In accordance with another aspect of the present invention, a filtration system is provided comprising a first filtration module including a first fluid communication opening and a first header having a first removable end cap engaged with an upper end of the first header and a first filtration cartridge having an end disposed in a lower end of the first header, a second filtration module including a second fluid communication opening and a second header having a second removable end cap engaged with an upper end of the second header and a second filtration cartridge having an end disposed in a lower end of the second header, and a first common fluid transfer manifold in fluid communication with the first fluid communication opening and the second fluid communication opening positioned between the first filtration module and the second filtration module.

In accordance with some embodiments, the first common fluid transfer manifold is in fluid communication with lumens of membrane fibers included in the first filtration module and with lumens of membrane fibers included in the second filtration module.

In accordance with some embodiments, the filtration system further comprises a second common fluid transfer manifold located between the first header and the second header, and in fluid communication with external surfaces of membrane fibers included in the first filtration module and with external surfaces of membrane fibers included in the second filtration module.

In accordance with some embodiments, the first header includes an internal diameter greater than an external diameter of the first filtration cartridge header includes an internal diameter greater than an external diameter of the second filtration cartridge.

In accordance with some embodiments, one or more fluid communication openings defined in each of the first housing and the second housing are in fluid communication with both the first filtration cartridge and the second filtration cartridge.

In accordance with some embodiments, the first removable end cap is engaged with the first open-ended housing to define a filtrate collection chamber between the first removable end cap and the first filtration cartridge.

In accordance with some embodiments, the first removable end cap includes a fluid communication passageway in fluid communication between the filtrate collection chamber and the first fluid communication opening.

In accordance with another aspect of the present invention, a method of operating a filtration system is provided comprising passing a feed through a plurality of filtration modules each including a filtration cartridge, the plurality of filtration modules fluidly connected by a common feed transfer manifold and a common filtrate transfer manifold, the plurality of filtration modules each including respective removable end caps disposed in respective open-ended upper housings, isolating the filtration cartridge of a first filtration module of the plurality of filtration modules from the common filtrate manifold and taking the first filtration module out of operation by engaging a shut-off valve in the end cap of the first filtration module, disengaging the removable end cap from the open-ended upper housing of the first filtration module, accessing the filtration cartridge of the first filtration module by longitudinally displacing the filtration cartridge of the first filtration module through the housing of the first filtration module, re-engaging the removable end cap with the housing of the first filtration module assembly, and returning the first filtration module assembly to operation.

In accordance with some embodiments, disengaging the removable end cap from the housing of the first filtration module assembly includes rotating the removable end cap of the first filtration module relative to the housing of the first filtration module, disengaging screw threads formed on the removable end cap of the first filtration module from mating screw threads provided on an upper portion of an inner wall of the housing of the first filtration module.

DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 11 is a schematic front elevation view of a row of pairs of filtration modules mounted on a support rack according to an exemplary embodiment of the present invention;

FIG. 12 is a schematic perspective view of the rack of filtration modules of FIG. 11;

DETAILED DESCRIPTION

Filtration module assemblies often comprise a header that retains a filtration cartridge. The filtration cartridge may comprise a filtration sub-system and may in some embodiments comprise a plurality of membranes. The filtration cartridge is mounted to the header and permeate received from the filtration cartridge is passed through the header, and thus the filtration module, and drawn off as filtrate. Filtration systems often comprise a plurality of such filtration modules fluidly connected to one another by manifolds. Manifolds are typically positioned above and below the filtration module headers and communicate fluids to and from the modules via the headers.

The filter cartridges in these systems often have a finite life and may need to be removed for cleaning and/or replacement at regular intervals during the operating life of a filtration system. Filter cartridges that require service are typically removed by first removing, for example, by vertically displacing, the header mountings to release the filter cartridge from the module. The cartridge is then removed from the module.

The membranes in the modules may require regular testing, evaluation, diagnosis, cleaning and/or replacement. Filtration module assemblies often have manifolds vertically positioned above modules. The position of the manifolds may require that the modules be removed laterally to maneuver around the vertically positioned manifolds. Filtration systems generally comprise a plurality of filtration modules, and the modules are often arranged in banks that form large arrays. Accessing a single membrane module in a filtration system may require that multiple neighboring modules in the bank also be removed to provide access to a module in need of service. This is particularly problematic when the module is located deep within a bank. Evaluating or servicing a single module, especially one located deep within a multi-rowed array of membrane modules, can be time and labor intensive and result in the filtration system being off-line for undesirably long and costly periods of time.

Additionally, filtration systems generally include modules suspended vertically from an overhead supporting frame so that the headers and the header mountings can be displaced vertically to enable the cartridges to be removed laterally. Overhead supporting frames are often expensive to produce and maintain.

One or more aspects of the present invention relate to improved filtration module assemblies. The improved filtration module assemblies of the present invention may be advantageously used in filtration systems.

Aspects and embodiments of the filtration module assemblies disclosed may advantageously reduce the downtime required to service a filtration module of a filtration system. Aspects and embodiments of the filtration module assemblies disclosed may also enable filtration modules of a filtration system to be mounted in an improved mounting arrangement.

Figure 1:
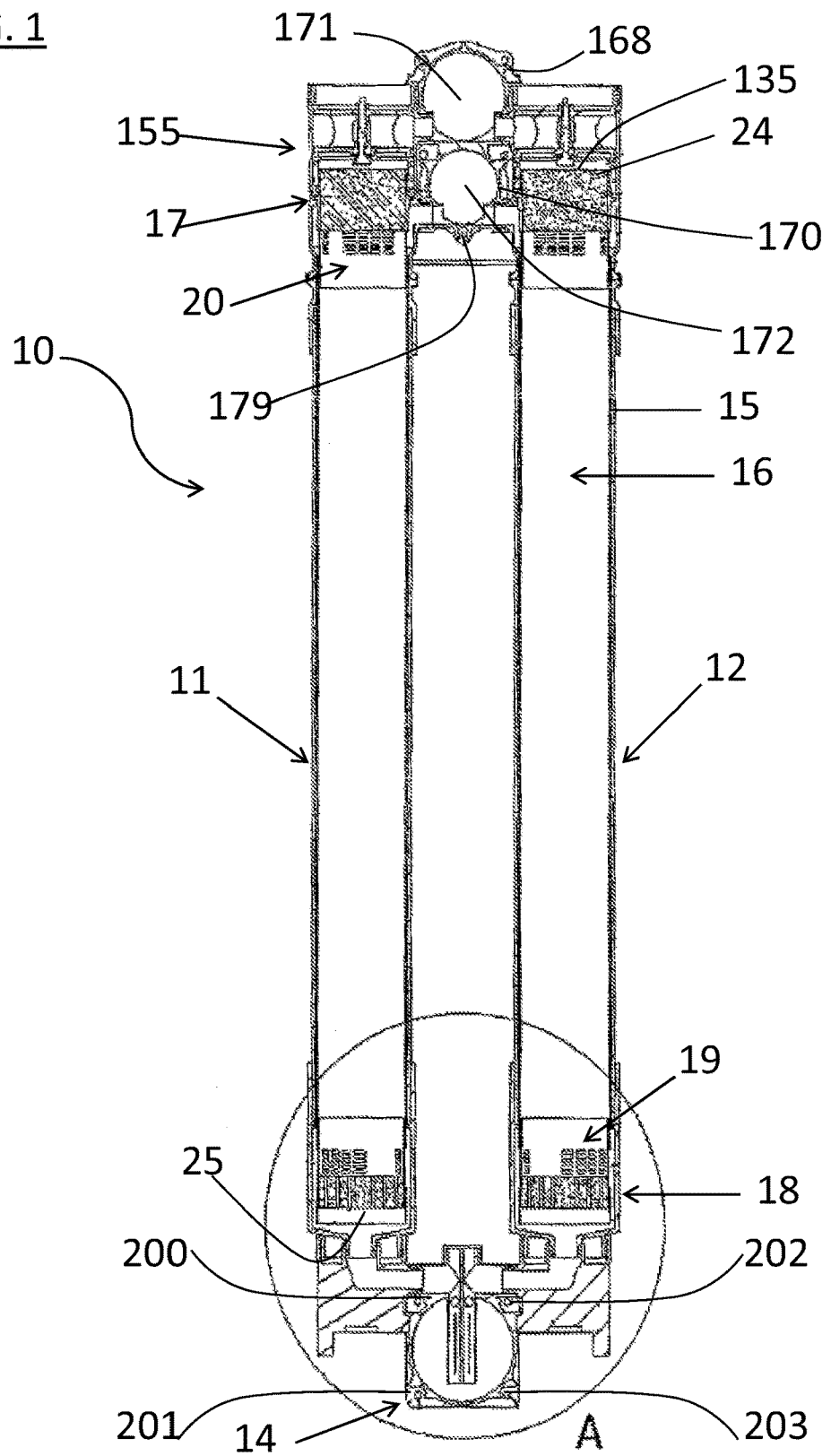
FIG. 1 is a schematic cross-sectional elevation view of a pair of membrane filtration modules according to an exemplary embodiment of the present invention.

A filtration module assembly in accordance with an embodiment of the present invention is illustrated generally at 10 in FIG. 1. Assembly 10 has filter modules 11 and 12 in fluid communication with common upper and lower manifolds, 13 and 14, respectively. In some instances, filter modules 11 and 12 may be referred to as membrane modules, and in some instances, may be referred to as a pair of modules. Each filtration module 11 and 12 includes a tubular outer casing 15 that encloses a respective cartridge 16. The cartridge may comprise a plurality of hollow fiber membranes (not shown) potted in and extending vertically between opposed upper and lower potting heads 17 and 18, respectively. Potting heads 17 and 18 are typically formed of resinous potting material. Potting heads 17 and 18, in the embodiment illustrated in FIG. 1, are generally cylindrical in configuration though the shape and size of the potting heads is not narrowly critical and a variety of configurations may be used including square, rectangular, triangular, or elliptical blocks. Potting heads 17 and 18 are cast into and peripherally surrounded by respective potting sleeves 20 and 19. Each module 11 and 12 has an upper header 155.

The hollow fiber membranes form the working part of the filter cartridge. Each fiber membrane may have an average pore size of about 0.2 micron, a wall thickness of about 600 microns and a lumen diameter of about 200 microns. The fiber membranes may be arranged in bundles. There may be about 14,000 hollow fibers in the bundle, but this number, as well as the individual fiber dimensions and characteristics are not narrowly critical and may be varied according to operational requirements.

Figure 2:
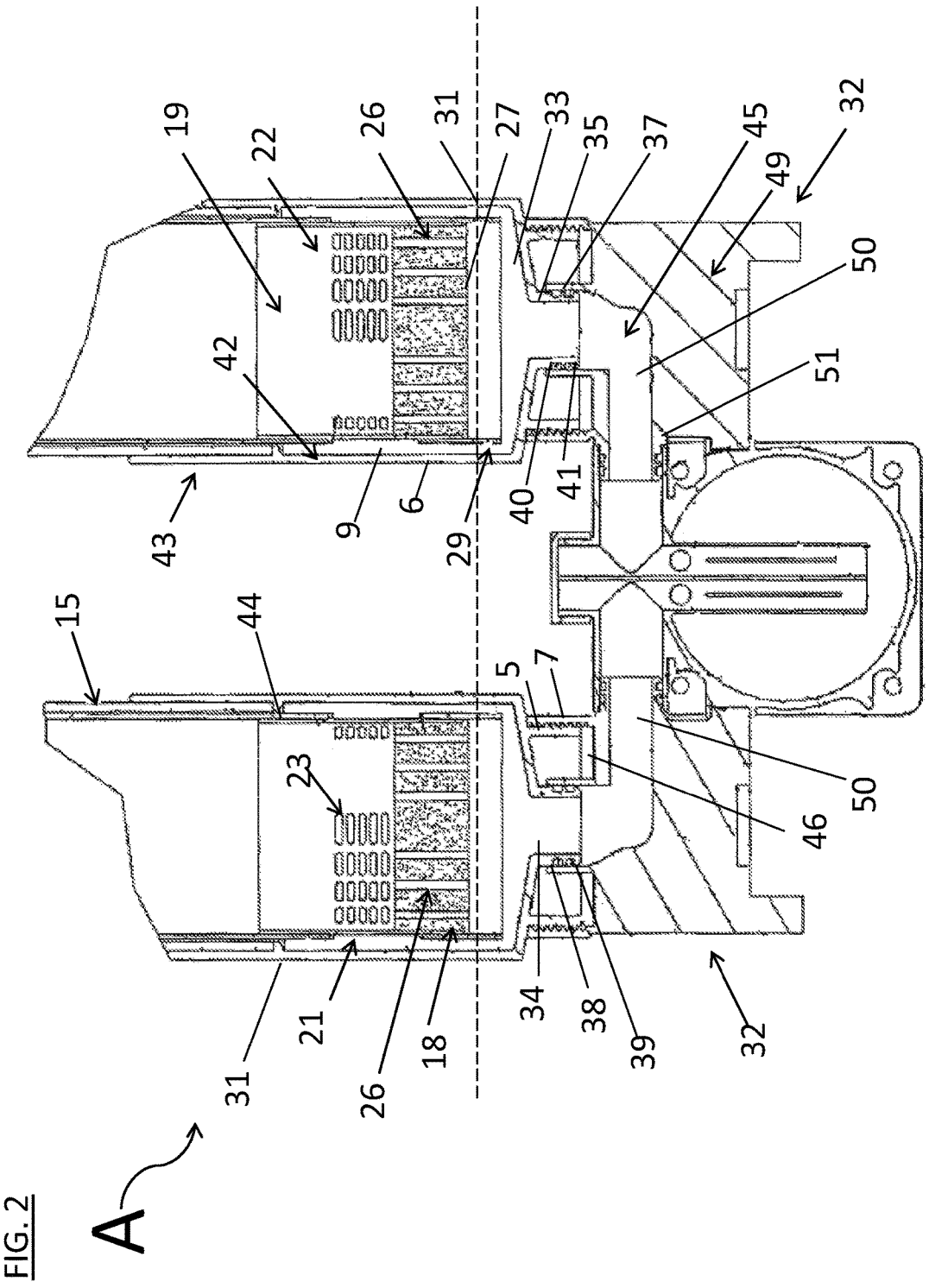
FIG. 2 is an enlarged schematic cross-sectional elevation view of region A of FIG. 1.

In accordance with some embodiments, membrane potting sleeves may have features that enable the transfer of fluid between the membrane lumens and a fluid communication region of the module. Referring to FIG. 2, each potting sleeve 19 extends beyond the interface between the potting head 18 and the membrane fibers to form fluid communication region 21. Each potting sleeve has a plurality of openings 22 formed therein and located in fluid communication region 21. In accordance with some embodiments, an array of openings 22 is spaced circumferentially and longitudinally from each other about the posting sleeves. Each opening 23 is in the form of a circumferentially extending slot. The size, shape and number of openings 23 is not narrowly critical. The openings may have other configurations than shown and may have varying geometries. Referring also to FIG. 1, each potting sleeve 19 and 20 has a plurality of openings 22. The array of openings 22 is may be located towards the distal end of each potting head (the end toward the internal portion of the module). The openings 22 are located towards distal ends 24 and 25 of each respectively potting head 17 and 18.

In accordance with some embodiments, a lower potting head may comprise through passages that promote the transfer of fluid between the potting head and the potted membrane fibers. Referring to FIG. 2, lower potting head 18 has a plurality of through passages 26 which extend generally longitudinally from the lower end surface 27 of the lower potting head 18 to its upper surface from which the potted membrane fibers (not shown) extend. The lower potting head 18 has a downwardly extending skirt 29 which extends beyond the lower end surface 27 of lower potting head 18.

In accordance with aspects and embodiments of the present invention, the lower potting sleeves of membrane modules may be fitted in and coupled to lower sockets. The sockets may be in communication with a fluid control manifold advantageously offset from the lower sockets to facilitate servicing. Referring to FIG. 2, lower potting head 18 and its respective potting sleeve 19 are fitted into lower socket 31. The lower portion 33 of the lower socket 31 tapers inwardly to a tubular neck portion 34 and a downwardly extending connection flange 35. Neck portion 34 and connection flange 35 are in fluid communication with fluid transfer port 45 and mating connection flange 37 in lower header 32. Circumferential grooves 38 and 39 positioned around the neck portion 34 of socket 31 receive O-rings 40 and 41 to provide a sealing engagement between socket 31 and lower header 32 via mating connecting flange 37.

Annular flange 5 extends from lower socket 31 between the tubular neck portion 34 and an outer wall 6 of socket 31. Flange 5 has screw threads to threading engage with a mating upwardly extending annular flange 7 provided on the upper side of the lower header 32. Annular flanges 5 and 7, when threadingly engaged, are positioned so as to align the respective mating connecting flanges 35 and 37.

In accordance with aspects and embodiments, a lower socket may advantageously receive and support a membrane module. In some embodiments, the support provided by the socket may facilitate the use of an improved filtration system frame. Still referring to FIG. 2, the inner wall 42 of upper portion 43 of lower socket 31 has an inwardly extending circumferential rib 44 constructed to receive and support an outer casing 15 of the module. Outer casing 15 fits within the upper portion 43 of the lower socket 31 and is supported by rib 44. Rib 44 may be segmented or formed by a plurality of protrusions.

The lower socket may advantageously define a fluid transfer passageway between the openings in the lower potting sleeve and a fluid transport port located in the lower header. Below circumferential rib 44, inner wall 42 of the lower socket 31 is radially spaced from the lower potting sleeve 19 to define an annular fluid transfer passageway 9. Annular fluid passageway 9 is positioned between and in fluid communication with the openings 22 in lower potting sleeve 19 and a fluid transfer port 45 of lower header 32.

In accordance with aspects and embodiments of the present invention, a membrane module may be fitted into an upper open ended header housing and a lower socket. The header housing may advantageously facilitate access to a membrane module received by the housing, particularly when the module is one of a plurality of modules in a filtration system. Referring generally FIG. 1, upper potting head 17 and potting sleeve 20 are received by upper open-ended header housing 30. Upper open ended header housing 30 may be referred to as upper header housing 30, header housing 30, or simply housing 30. Lower potting head 18 and sleeve 19 are fitted into lower socket 31. Referring also to FIG. 2, lower header 32 has fluid transfer port 45 centrally located in its upper side 46 with a tubular mating connection flange 37 sized to receive the tubular connection flange 35 of respective lower socket 31. In accordance with some embodiments, the lower header 32 may be a combined feed/gas header. Lower header 32 may have a head piece 49 with an internal fluid connection passageway 50 extending downward from fluid transfer port 45 and radially outward to a side of head piece 49 into a radially protruding connection flange 51.

Figure 3:
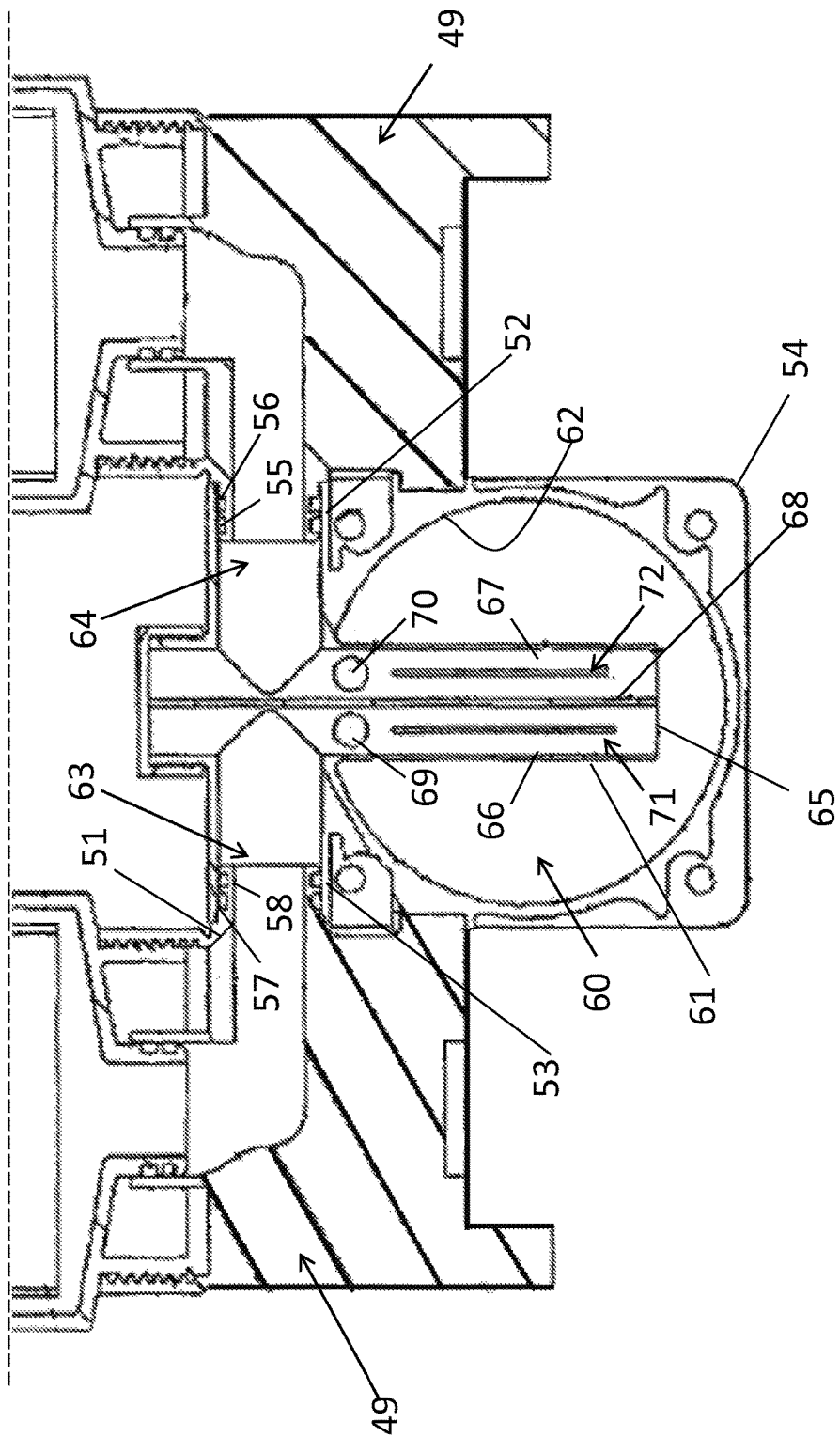
FIG. 3 is a further enlarged schematic cross-sectional elevation view of the portion of region A below the dotted line shown in FIG. 2.

In accordance with aspects and embodiments, a common fluid control manifold may be offset from beneath the lower potting heads and may, in some embodiments, be advantageously positioned below and between membrane modules. Referring to FIG. 3, radially protruding connection flange 51 of each head piece 49 fits within and sealingly connects to connection flanges 52 and 53 of a common fluid control manifold 54. Common fluid control manifold 54 is advantageously located between the lower head pieces 49 of each module. Radially protruding connection flange 51 has a pair of circumferential grooves 55 and 56 for receiving O-rings 57 and 58, respectively, to provide sealing engagement with the respective mating connecting flanges 52 and 53 of manifold 54.

The body of the fluid control manifold 54 includes sidewalls that define a feed passageway 60 and a control port 61 which extends generally vertically downward in a radial direction from an upper wall 62 of the feed passageway 60 and into the feed passageway 60. Control port 61 may be a conduit in the form of a pipe or a tube. Control port 61 may be referred to as conduit 61, and the as used herein, the terms are interchangeable.

Fluid may be fed into one or more passageways in fluid communication with the fluid passageway 60 of fluid control manifold 54. For example, and referring to FIG. 3, output passageways 63 and 64 are connected to respective connecting flanges 51 and 52 of fluid control manifold 54. Output passageways 63 and 64 are in fluid communication with feed passageway 60 by fluid connection with the proximal end of conduit 61. Conduit 61 is open at its lower distal end 65 to allow inflow of feed from feed passageway 60. The feed fluid in passageway 60 may be feed liquid to be filtered, permeate, gas, or any combination thereof. Conduit 61 may be divided into a plurality of passageways. For example, conduit 61 may be divided by a pair of passageways 66 and 67 by one or more longitudinally extending partitions 68 located along the diameter of the conduit 61 and extending upward from lower distal end 65. Conduit 61 passes through the upper wall 62 of feed passageway 60 and may have one or more aeration apertures, for example, a pair of openings 69 and 70 in its side wall. Apertures 69 and 70 provide fluid communication between feed passageway 60 and respective output passageways 63 and 64. The number of aeration openings in the conduit 61 may correspond to the number of passages formed therein or may vary. In some embodiments, various aeration openings may be placed at different heights within fluid control manifold 54.

In some embodiments, aeration control apertures and corresponding passageways may advantageously allow a flow of gas through the membrane module without displacing liquid in the feed passageway. In some embodiments, aeration control features may advantageously prevent the conduit in the common fluid manifold from becoming completely filled with gas. Referring to FIG. 3, conduit 61 in common fluid manifold 54 has aeration control apertures 71 and 72 each in communication with a respective passage 66 and 67 of conduit 61. The number of aeration control apertures in conduit 61 may correspond to the number of passages formed therein, with at least one aeration control aperture opening into each of the passages, or may vary. Aeration control apertures 71 and 72 are positioned at locations spaced vertically from the lower distal end 65 of conduit 61. This position advantageously allows gas to flow through aeration control apertures 71 and 72 without displacing liquid within feed passageway 60. The aeration control apertures may beneficially prevent conduit 61 from being completely filled with gas. Aeration control apertures 71 and 72 may in some embodiments be placed at different heights within the feed passageway 60 to obtain other desirable gas flows.

Figure 4:
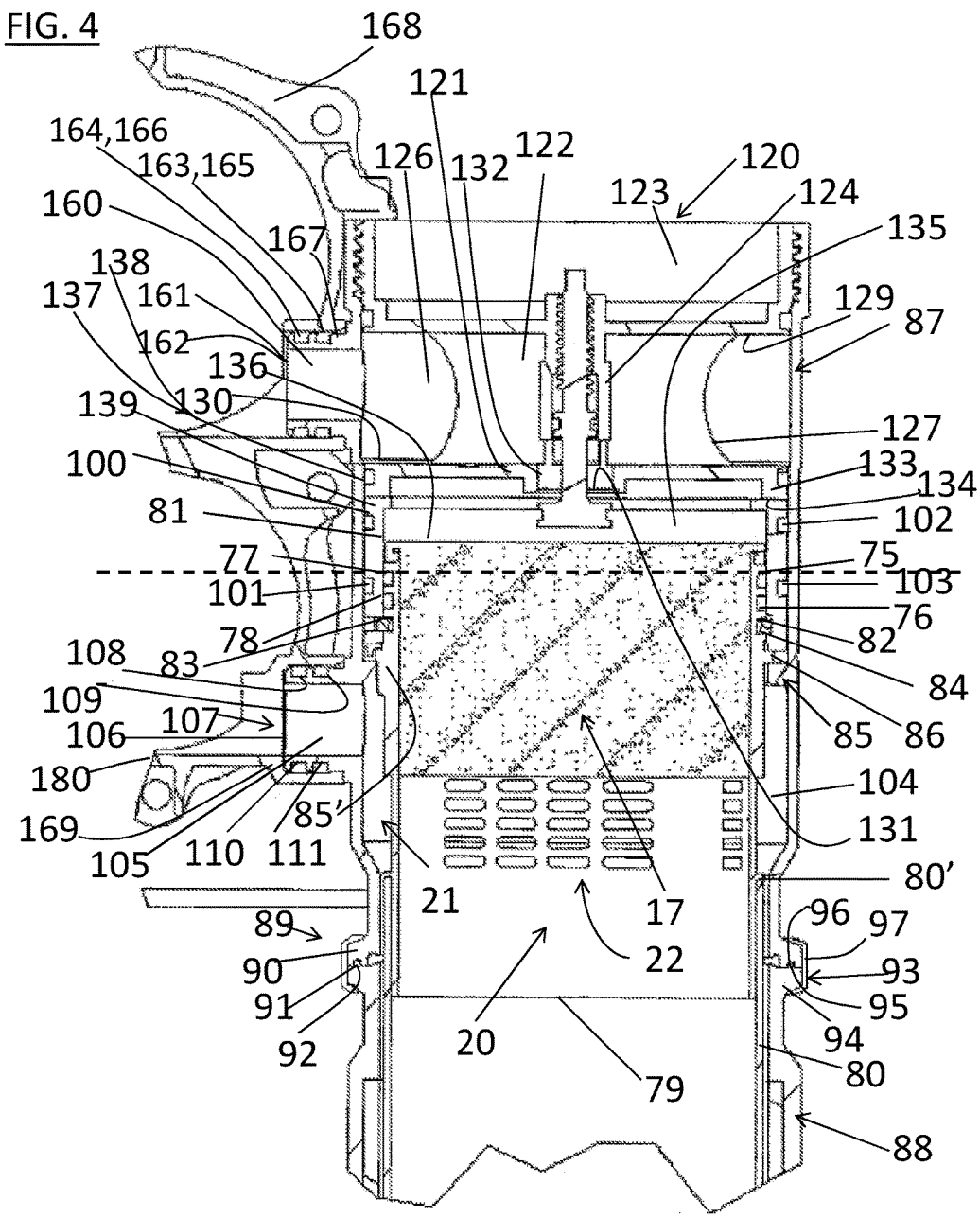
FIG. 4 is an enlarged schematic cross-sectional elevation view of an upper potting head of a membrane filtration module according to an exemplary embodiment of the present invention.

Referring to FIGS. 1 and 4, the upper ends of the fiber membranes (not shown) are embedded in upper potting head 17. Potting head 17 may include, for example, a plug of resinous material such as polyurethane. The material is cast into potting sleeve 20. In accordance with aspects and embodiments of the present invention, the potted membrane fibers in the membrane modules may be enclosed by a screen 80. The screen may serve to protect the membranes during handling and also assist in retaining fluid flow within the membrane bundle. In some embodiments, the screen may have a smooth surface to reduce potential abrasion of the membranes in use. The lower end 79 of the upper potting sleeve 20 receives the cylindrical screen 80, when present, which encloses the fiber membranes (not shown). The cylindrical screen 80 extends between the lower end 79 of the upper potting sleeve 20 and the upper end of the lower potting sleeve 19 (as shown in FIG. 1). Screen 80 extends longitudinally along the outer wall of the potting sleeve to a position spaced from the fluid communication region 21 by a circumferential rib 80'. In one preferred embodiment, screen 80 is a thin-walled solid tube but other forms of screen, for example, a perforated tube or cage-like mesh may be used.

In accordance with aspects and embodiments of the present invention, an upper potting head and potting sleeve may advantageously be received by an annular adapter. The annular adapter may be mounted within an upper header housing and the configuration may advantageously benefit the construction of filtration modules, filtration system assemblies, and facilitate the service of modules positioned in such assemblies.

Referring again to FIGS. 1 and 4, upper potting head 17 and potting sleeve 20 fit within an annular adaptor 81. The upper potting sleeve 20 and annular adaptor 81 are surrounded by and mounted within upper header housing 30. The upper header housing 30 is open-ended and dimensioned to closely receive upper potting sleeve 20 and annular adaptor 81. Grooves 75 and 76 positioned around the periphery of the upper end of potting sleeve 20 receive O-rings 77 and 78, respectively, which may assist in mating sleeve 20 with annular adapter 81. Potting sleeve 20 is further engaged and held within annular adaptor 81 by means of circlip 82 located in mating grooves 83 and 84 provided on the respective external and internal walls of the upper potting sleeve 20 and annular adaptor 81. Upper potting sleeve 20 is further supported on a radially extending shoulder 85 of the upper header housing 30 by an outwardly extending rib 86 on the upper potting sleeve 20. A locking protrusion 85' is formed on the external wall of upper header housing 30. The locking protrusion 85' engages with a slot (not shown) formed in shoulder 85 to prevent relative rotation between the upper potting sleeve 20 and the upper header housing 30.

The upper header housing 30 is formed of upper and lower components 87 and 88 respectively. The lower end 89 of upper component 87 includes a peripheral flange 90. The lower face 91 of the peripheral flange 90 includes annular groove 92. The upper end 93 of the lower component 88 includes peripheral flange 94 which abuts peripheral flange 90. The upper face 95 of peripheral flange 94 includes annular rib 96 which is sized to mate with annular groove 92 when flanges 90 and 94 are abutted. Flanges 90 and 94 are held in an abutted engagement by an external C-section clip 97 which fits over and engages with the periphery of flanges 90 and 94. A dovetail seal is provided between flanges 90 and 94. Clip 97 may be a resilient self-actuating device biased to retain the flanges 90 and 94 in an abutted position, and may be, for example, a pipe clamp. In accordance with some embodiments, clip 97 may be constructed of stainless steel. Flanges 90 and 94 may be disengaged by spreading and removing clip 97. Clip 97 may be removed either manually or with a tool. In accordance with some embodiments, clip 97 may be removed with a spanner or pliers.

During filtration operations, annular adaptor 81 is sealingly engaged with upper component 87 of upper header housing 30. Annular grooves 100 and 101 positioned around the periphery of annular adaptor 81 support O-rings 102 and 103. O-rings 102 and 103 exert a force on the inner wall of upper housing component 87 to provide a sealing engagement.

In accordance with some embodiments, the upper header housing may have an enlarged diameter portion to form a fluid transfer passageway between the outer wall of the upper potting sleeve and the inner wall of the housing. Referring to FIG. 4, upper header housing 30 includes an enlarged diameter portion between lower end 89 of component 87 and annular grooves 100 and 101 on upper component 87. The enlarged diameter portion of housing 30 forms annular fluid transfer passageway 104. Fluid transfer passageway 104 is positioned between the outer wall of upper potting sleeve 20 and the inner wall of the upper component 87 of upper header housing 30 and is in fluid communication with common fluid region 21. A fluid transfer port 105 adjacent to and extending from the annular fluid transfer passageway 104 is located in a side wall of the upper header housing component 87. Fluid transfer port 105 includes tubular connection flange 106 at its free end 107. Annular grooves 108 and 109 support O-rings 110 and 111 around the periphery of connection flange 106.

Upper potting sleeve 20 has a plurality of openings 22 in fluid communication with common fluid region 21. During filtration, upper potting sleeve 20 is mounted within the upper header housing 30 and positioned such that the plurality of openings 22 are further in fluid communication with annular fluid transfer passageway 104. In some embodiments, it may be desirable to prevent the rotation of potting sleeve 20 relative to upper header housing 30. Rotation of potting sleeve 20, and thus apertures 22, may be capable of causing damage to the membranes in the fluid outflow region. Locking protrusion 85' advantageously prevents such rotation and fixably spaces the location of openings 22 from the fluid transfer port 105 to prevent damage to the membranes in the region of fluid outflow.

In accordance with aspects and embodiments of the present invention, an upper potting sleeve and attached annular adapter may be held at a mounting location within an upper header housing by a removable end cap. The removable end cap may sealingly engage the membrane assembly with the housing and may define a filtrate discharge passageway. As used herein, a "removable end cap" is one which may be reversibly removed from a membrane module without causing damage to either the removable end cap or any other portion of the membrane module in which it is included. A removable end cap which has been removed from a filtration module may be replaced in the module and the module may operate with no loss of performance caused by the removal and replacement of the removable end cap.

Figure 5:
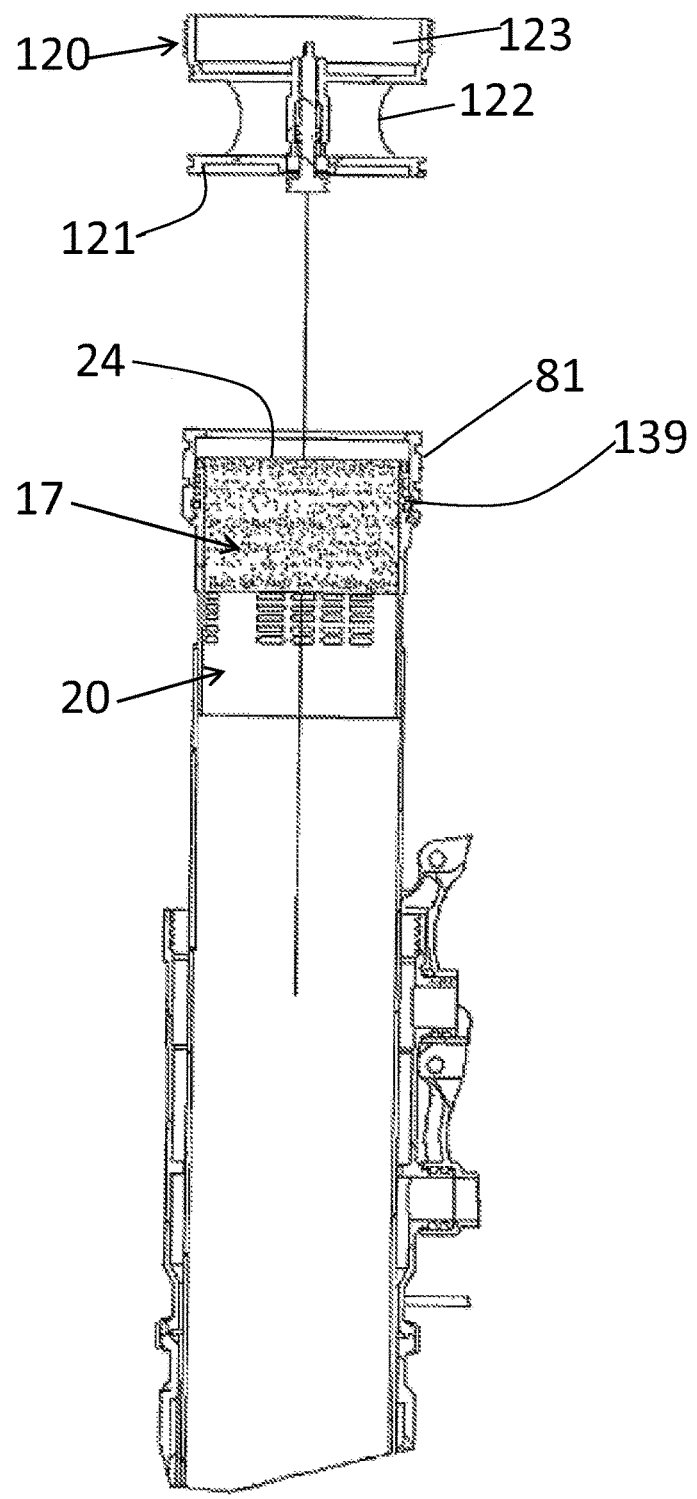
FIG. 5 is a schematic, partially exploded, cross-sectional elevation view of an upper potting head of a membrane filtration module in accordance with an exemplary embodiment of the present invention.

Referring to FIG. 5 upper sleeve 20 containing potting head 17 is received by and coupled to annular adaptor 81. Annular adapter 81 is held at the mounting position within upper header housing 30 by a removable end cap 120. Removable end cap 120 may be referred to simply as end cap 120. End cap 120 has a base portion 121, a reduced diameter mid portion 122 and an upper portion 123. Referring to FIG. 4, a filtrate discharge passageway 126 is defined by the inner wall of upper header housing component 87, the outer wall surface of the reduced diameter mid-portion 122 of end cap 120, the bottom surface of end-cap upper portion 123, and the top surface of end-cap base portion 121. Filtrate discharge passageway 126 has an internal concave wall 127, upper wall 129, and lower wall 130. A plurality of radially extending reinforcement ribs (not shown) extend between the upper and lower walls 129 and 130 of the filtrate discharge passageway 126.

Referring to FIGS. 4 and 5, base portion 121 of the end cap 120 has a central boss portion 131 through which a shut-off passageway 124 opens at its lower end 132. The base portion 121 has a circumferential downwardly extending rib 133 which bears against an upper peripheral edge 134 of annular adaptor 81. The upper peripheral edge 134 of annular adaptor 81 includes an inwardly extending circumferential lifting shoulder 139 that that abuts extending rib 133. When abutted, rib 133 and shoulder 139 position base portion 121 above the upper surface 136 of the upper potting head to define a filtrate receiving chamber 135. Filtrate receiving chamber 135 is positioned between the upper surface 136 of the upper potting head 17 and end cap 120. Open ends of the fiber membranes potted in upper potting head 17 open into filtrate receiving chamber 135 and provide fluid communication between the membrane fiber lumens and filtrate receiving chamber 135.

A peripheral groove 137 is positioned adjacent the downwardly extending rib 133 of end cap base portion 121 and supports O-ring 138. Groove 137 and O-ring 138 sealing engage end cap 120 and upper header housing 30.

Figure 6:
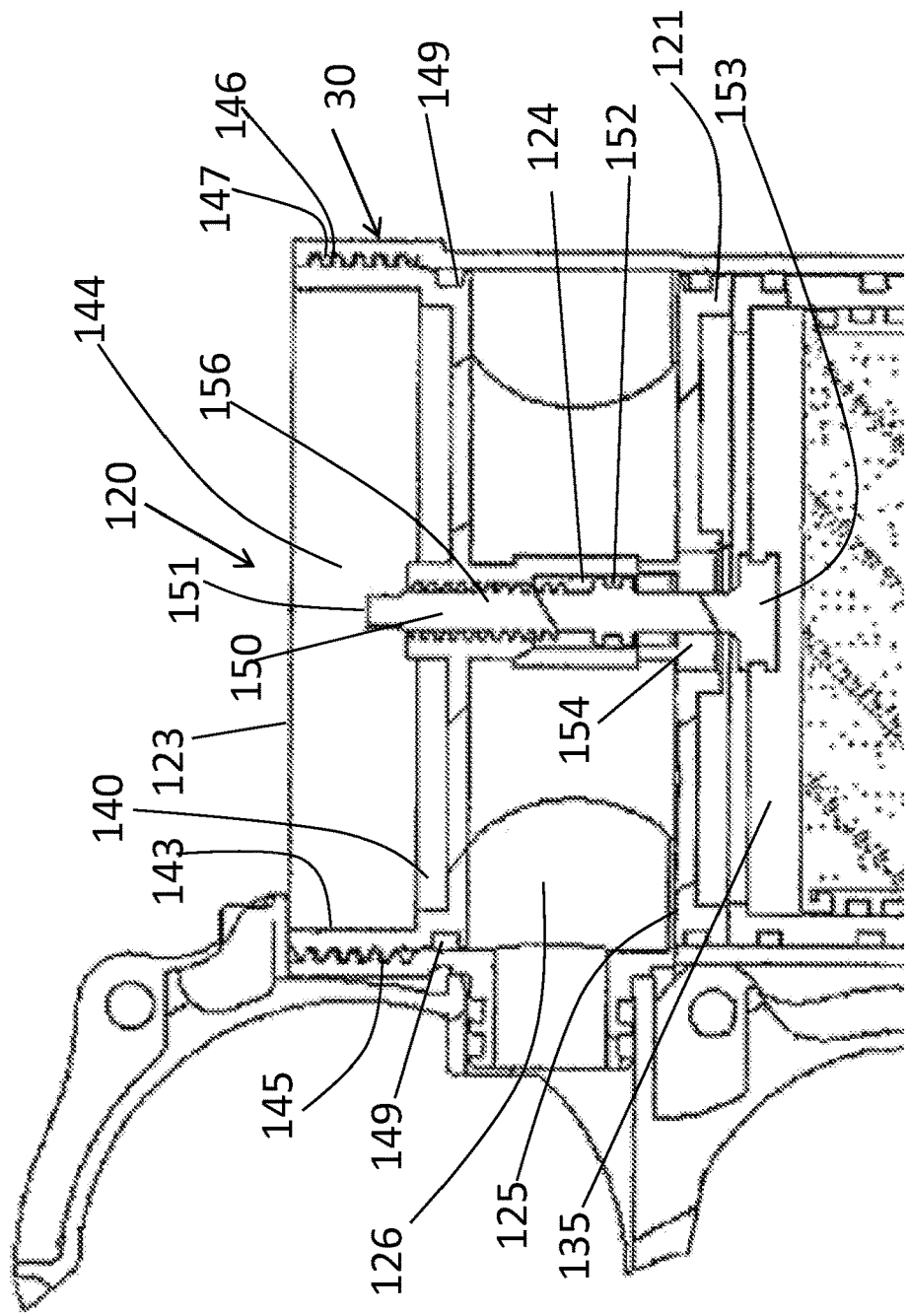
FIG. 6 is an enlarged schematic cross-sectional elevation view of a membrane filtration module having a removable end cap according to an exemplary embodiment of the present invention.

Referring also to FIG. 6, the upper portion 123 of end cap 120 has a floor 140 with a centrally located boss portion 141. A peripherally stepped wall 143 extends upward from floor 140 of upper portion 123 to define an upwardly opening recess 144. The outer peripheral surface of an upper portion 145 of the stepped wall 143 includes screw threads 146 which threadingly engage mating screw threads 147 on an upper portion of the inner wall surface of header housing 30.

The outer wall of the upper portion 123 of the end cap 120, adjacent the step and below screw threads 146 has a peripheral groove 148 which supports O-ring 149. This arrangement, together with O-ring 138, serves to form a fluid tight seal of a filtrate discharge passageway 126.

In accordance with some embodiments, the removable end cap may have features that advantageously control fluid flow. In some embodiments, a valve may operate to disconnect a filtration cartridge from a filtration system without interfering with other modules in the system.

Referring to FIG. 6, end cap 120 includes a centrally located shut-off passageway 124. Shut-off passageway 124 extends from upper portion 123 to side 125 of base portion 121. Shut-off passageway 124 houses a shut-off valve 150 which selectively provides fluid communication from the filtrate receiving chamber 135 to the interior of the filtrate discharge passageway 126. The top portion 151 of shut-off valve 150 has an aperture (not shown) for receiving an adjustment tool, for example, a screw driver or wrench for actuating the valve. In accordance with some embodiments, shut-off valve 150 may be activated manually. In accordance with other embodiments, shut-off valve 150 may be remotely activated using, for example, a remotely controlled servo motor (not shown) or other actuator. Seal 152 positioned adjacent the central portion of shut-off valve 150 provides a fluid-tight seal between shut-off valve 150 and the interior wall of shut-off passageway 124.

Port 154 in end cap 120 fluidly connects filtrate collection chamber 135 and filtrate passageway 160. Shut-off valve 150 includes seal 153 positioned on the lower end of valve 150. When shut-off valve 150 is moved upwardly, seal 153 closes port 154 to prevent flow of filtrate out of filtrate collection chamber 135 and into filtrate discharge passageway 126. The closing of port 154 does not, however, interfere with the flow of filtrate from and to adjacent module headers through filtrate passageway 126. Shut-off valve 150 is designed such that it can be readily operated without having to dismantle component parts of the filter assembly. Shut-off valve 150 may advantageously allow a single membrane module of a filtration system comprising a plurality of modules to be taken offline without requiring other surrounding modules be taken offline as well.

In accordance with some embodiments, valve 150 may be moved from the open position to the closed position by rotating shaft 156 of valve 150 in a screw threading engagement with the inner wall of shut-off passageway 124. Rotating shaft 156 in passageway 124 in a first direction causes upward axial movement of seal 153 and closes port 154. Shut-off valve 150 may be opened by rotating shaft 156 in an opposite direction.

In accordance with some embodiments, valve 150 may have features that further assist an operator of a filtration system. Shaft 156 of shut off valve 150 may, for example, protrude from a lower wall of the upper portion of 123 of end cap 120 when activated so that it is easily ascertainable, even at a distance, that the valve is in the closed position and that the module which the valve controls is disconnected or offline. In accordance with some embodiments, the shut-off passageway 124 may have a transparent window or may be formed of transparent material so that air bubbles can be observed by an operator during a pressure test or a pressure decay test.

The header housings of the present invention may facilitate the construction and design of filtration systems comprising multiple membrane modules housed in header housings as described herein. The header housings of aspects of the present invention may provide for the fluid connection of membrane modules to common fluid manifolds that are advantageously positioned to facilitate an improved method of servicing a filtration system. The header housings of the present invention may additionally facilitate the construction of improved filtration system support frames.

Referring again to FIG. 4, the upper component 87 of header housing 30 includes a filtrate transfer port 160 positioned in a side wall of upper component 87 adjacent to and extending from filtrate discharge passageway 126. Filtrate transfer port 160 has a radially protruding tubular connection flange 161 at its free end 162. Annular grooves 163 and 164 support O-rings 165 and 166 around the periphery of the tubular connection flange 161. Radially protruding connection flange 161 of filtrate transfer port 160 fits within and is sealingly connected to a connection flange 167 located on a common filtrate transfer manifold 168. Common filtrate transfer manifold 168 is positioned between the upper headers 155 of modules 11 and 12.

With continued reference to FIG. 4, fluid transfer port 105 also includes a radially protruding connection flange 106. Radially protruding connection flange 106 fits within and is sealingly connected to a connection flange 169 of a common fluid (for example, feed) transfer manifold 170 located below common filtrate transfer manifold 168 and between the upper headers 155 of modules 11 and 12. O-rings 110 and 111 mate with and provide a sealing engagement with connecting flange 169 of fluid transfer manifold 170. Referring to FIGS. 1 and 2, and as discussed, modules 11 and 12 are further fluidly connected by lower fluid transfer manifold 54.

Referring again to FIG. 1, fluid transfer manifold 170 and filtrate transfer manifold 168 are each provided with generally circular cross-sectional passageways 171 and 172, respectively. Passageways 171 and 172 extend normal to the longitudinal axis of modules 11 and 12. Filtrate transfer manifold 168 is mounted to and above fluid transfer manifold 170. Manifolds 168 and 170 are mounted between the upper header housings 30 of modules 11 and 12. Each of manifolds 168, 170, and 54 are advantageously positioned between the pair of modules.

Further, the position of upper manifolds 168 and 170 does not obstruct access to removable end caps 120.

In accordance with aspects and embodiments of the present invention, a filtration system may implement the filtration module assemblies and manifold configurations disclosed herein. The resultant improved filtration system may be more cost-effective to construct and maintain.

Figure 9:
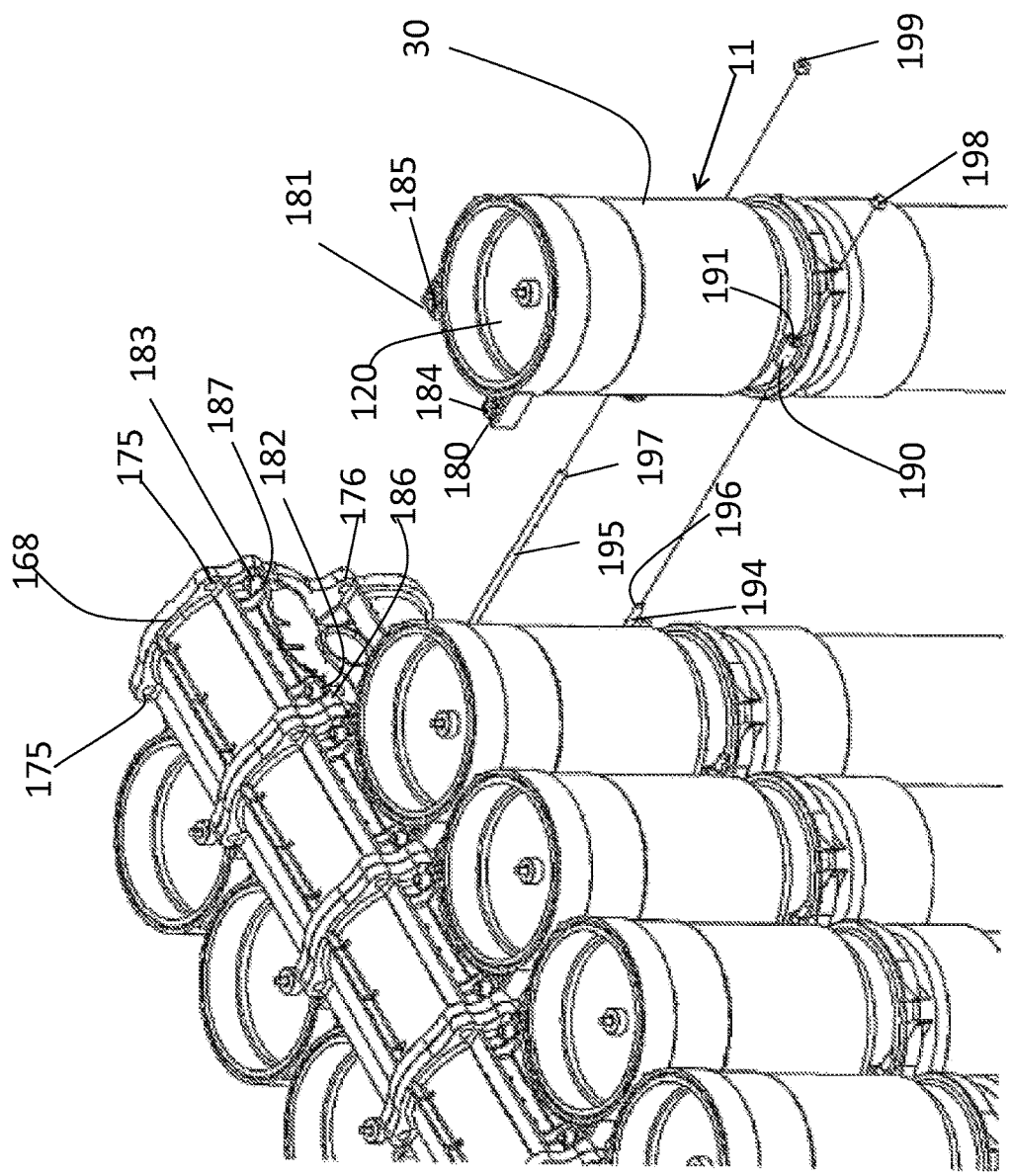
FIG. 9 is an enlarged schematic, partially exploded, perspective view of the rear upper portion of the bank of membrane filtration modules of FIG. 7.

Referring generally to FIG. 9, the outer walls of manifolds 168 and 170 include concave portions and form scallops. Manifold 54 likewise includes an outer wall including a concave portion. Header housings 30 have vertically extending, cylindrically profiled side walls. The concave portions of the walls of manifolds 168, 170, and 54 complement the convex geometry of the side walls of the header housings. The manifolds and header housings may mate to provide a compact filtration system.

Common manifolds 54, 168, and 170 are each substantially symmetric about planes defined by the longitudinal axes of the filter module assemblies. Flow of feed, filtrate, and gas within the manifolds passes predominantly perpendicularly to the longitudinal axes of the filter module assemblies. In some embodiments, each manifold 54, 168, and 170 includes planar side faces and at one side of each manifold there are grooves (not shown) for receiving O-rings around the ends of respective passageways 60, 171, and 172. At the opposite side of each manifold there are annular beveled projections (not shown) adapted to engage the O-rings of an adjacent manifold. Each manifold 54, 168, and 170 can be abutted against a like manifold so as to create a row of manifolds to which rows of membrane module pairs 11 and 12 can be connected. The arrangement may allow a greater packing density of modules than is possible in conventional filtration systems.

Figure 7:
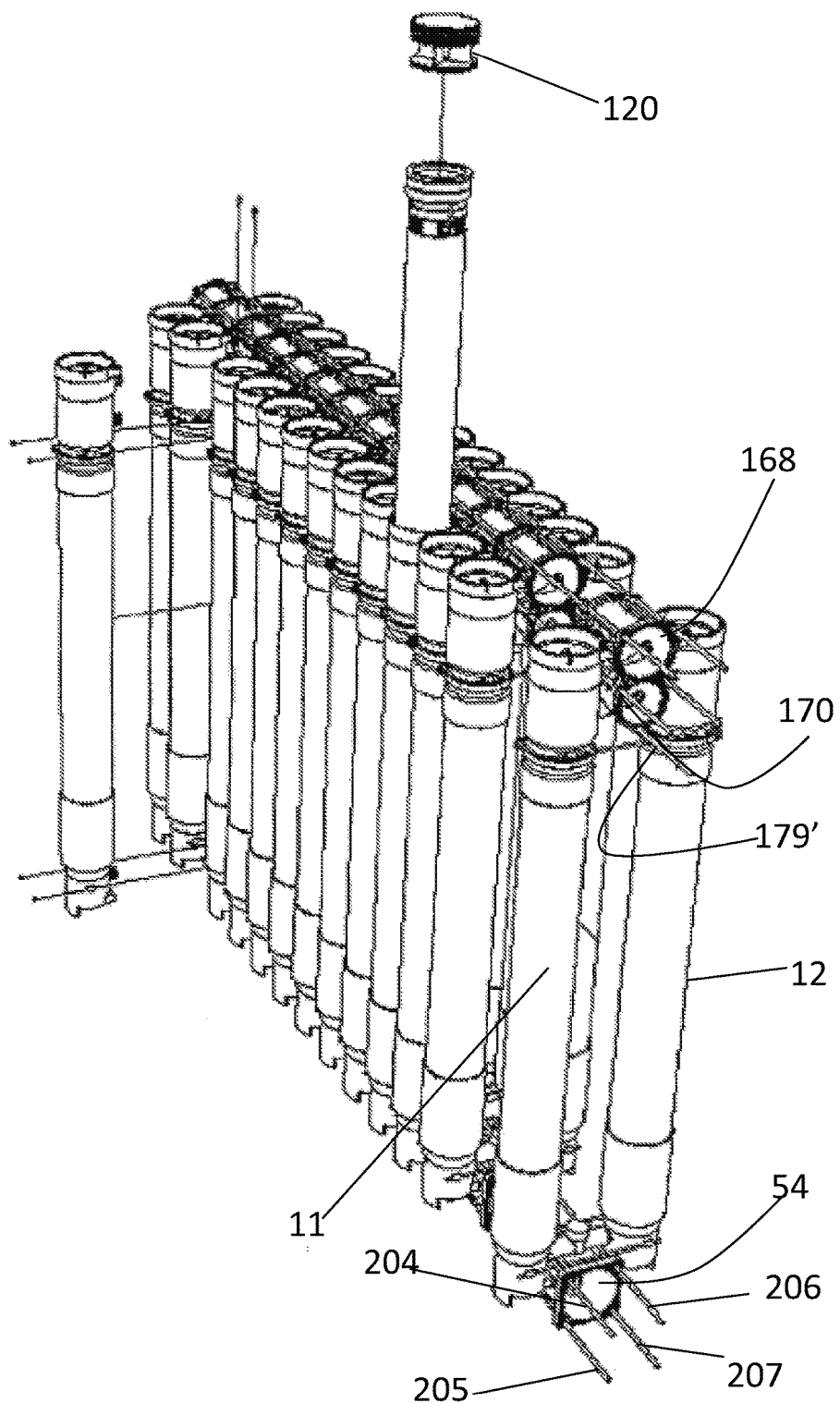
FIG. 7 is a front schematic, partially exploded, perspective view of a bank of membrane modules according to an exemplary embodiment of the present invention.
Figure 8:
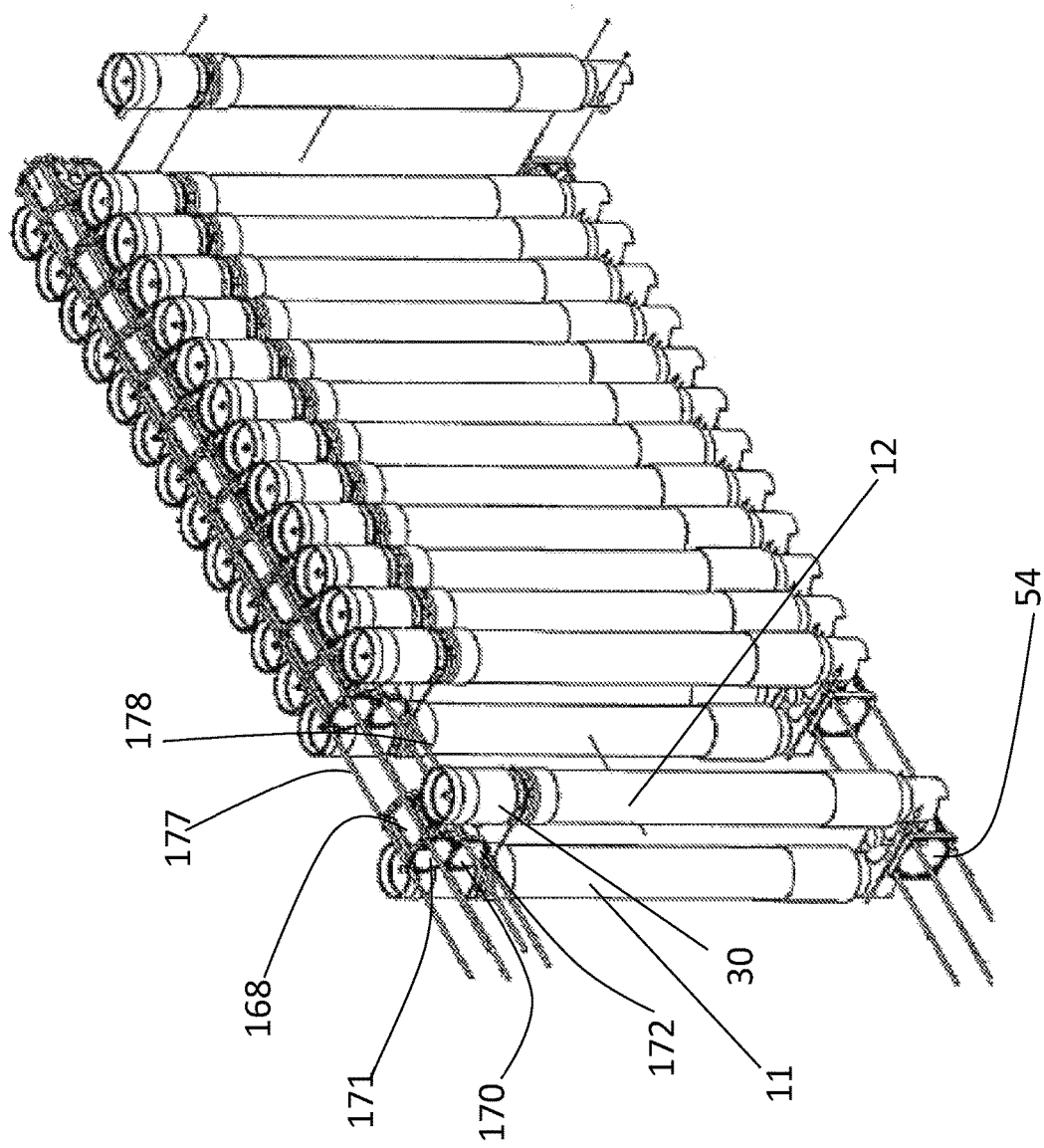
FIG. 8 is a rear schematic, partially exploded, perspective view of the bank of membrane modules of FIG. 7.

Referring to FIGS. 8 and 9, manifold 168 includes axially extending through passageways 175 positioned on either side of passageway 171. Manifold 170 similarly includes axially extending though passageways 176 positioned on either side of passageway 172. Through passageways 175 and 176 are adapted to receive tie bars 177 and 178. Tie bars 175 and 176 extend through passages 175 and 176 respectively to hold together and sealingly engage adjacent manifolds 168 and 170 when pairs of modules are arranged in a bank. Referring to FIG. 7, lower manifold 170 further includes through passageway 179 (best shown in FIG. 1) extending longitudinally along its base and is adapted to receive tie bar 179'.

Similarly and referring to FIGS. 1 and 7, lower manifold 54 includes upper and lower axially extending through passageways 200, 201, 202, 203 located on each external side wall adapted to receive tie bars 204, 205, 206, 207. Tie bars 204, 205, 206 and 207 pass through passageways 200, 201, 202, 203 to hold together and sealingly engage adjacent lower manifolds 54 when module pairs are arranged in a bank.

Referring to FIG. 9, the upper external wall of the upper portion of header housing 30, adjacent the top of the end cap 120, includes a pair of tangentially extending brackets 180 and 181 located on opposite sides of header housing 30. Brackets 180 and 181 mate with a pair of corresponding flanges 182 and 183 located on the opposed side walls of upper filtrate transfer manifold 168. Brackets 180 and 181 have vertical through holes 184 and 185, respectively, which align with and receive vertical location dowels 186 and 187 provided in respective flanges 182 and 183 of filtrate transfer manifold 168.

The lower external wall of the upper portion of the header housing 30 includes a pair of radially extending protrusions 190 with tangential through passages 191 formed therein. Protrusions 190 are located on opposed side walls (rear protrusion not shown) such that when the header housing 30 is joined to manifolds 168 and 170, tangential through passages 191 extend normal to the axes of the transfer manifolds 168 and 170. Tie bars 194 and 195 extend through the passages 191 of protrusions 190 of membrane module 11 and further extend through passages 191 of protrusions 190 of header housing 30 of membrane module 12. Tie bars 194 and 195 are provided with threaded end portions 196 and 197, respectively, to receive and engage respectively locking nuts 198 and 199 so as to axially pull the header housings 30 of modules 11 and 12 into an abutting engagement with transfer manifolds 168 and 170.

Figure 10:
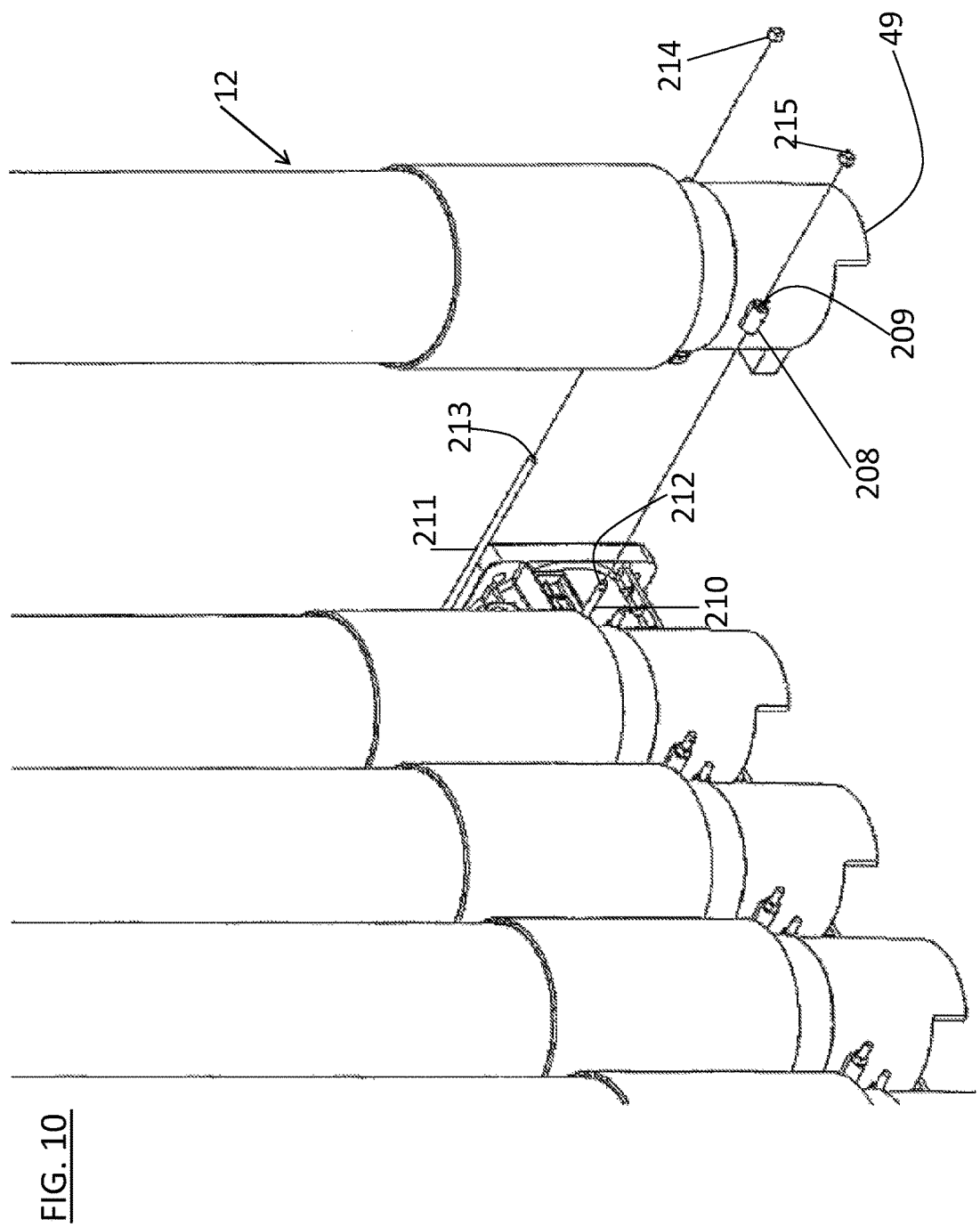
FIG. 10 is an enlarged schematic, partially exploded, perspective view of the rear lower portion of the bank of membrane filtration modules of FIG. 7.

Referring to FIG. 10, the external wall of lower head piece 49 includes a pair of radially extending protrusions 208 with tangential through passages 209 formed therein. Protrusions 208 are located on opposed side walls (rear protrusion not shown) such that when the lower header is joined to the lower manifold 54, the tangential through passages 209 extend normal to the axis of the lower manifold 54. Passages 209 of protrusions 208 are adapted to receive tie bars 210 and 211. Tie bars 210 and 211 extend through passages 209 of protrusions 208 of module 11 and extend through passages 209 of protrusions 208 of the lower head piece 49 of module 12. Tie bars 210 and 211 have threaded end portions 212 and 213 adapted receive and engage respective locking nuts 214 and 215. Tie bars 210 and 211 axially pull lower head pieces 49 of modules 11 and 12 into abutting engagement with lower manifold 54.

Those skilled in the art will recognize that alternate mechanisms for connecting the manifolds and/or headers together may also or additionally be utilized. For example, the manifolds and/or headers may be provided with clips, intersecting flanges, pressure fit couplings, or screw-like threading adapted to couple to complementary threading on adjacent modules and/or headers.

In accordance with some embodiments, the assemblies of the present invention may facilitate the construction of filtration system using a less-expensive, lighter-weight rack than possible in filtration systems comprising traditional assemblies. Because the modules, module pairs, and their associated headers are essentially self-supporting, the modules may be easily mounted in the lighter weight rack without comprising stability or performance.

Referring to FIGS. 11 and 12, a filtration system arrangement comprising a plurality of membrane module pairs 11 and 12 having filtration membranes included therein is formed on a rack formed of a pair of parallel base support rails 216 and 217 extending longitudinally along a row of module pairs. The lower header piece 49 of each module 11 and the lower header piece 49 of each module 12 is supported on rail 216 and rail 217, respectively. The bases of the lower head pieces 49 are advantageously stepped to facilitate positioning of the module pair between the support rails. End support members 218 and 219 extend vertically upward from the respective rails 216 and 217 at each end of the rack. A lower cross member 220 spaces the end support members and extends horizontally between the support members 218 and 219 adjacent to and above the lower headers 49. An upper cross member 221 further spaces the end support members 218 and 219 and extends horizontally between the support members adjacent to and below fluid transfer manifold 170. An upper longitudinal rail 222 extends along the length of and between the rows of module pairs and is supported on upper cross members 221. Each base support rail 216 and 217 includes feet 223, 224 and 225 which extend downward from the respective ends of the rails and at a mid portion of each rail. The feet support the lower head pieces 49 above the lower common manifolds 54.

The filtration systems and module assemblies of the present invention may improve the ease with which the system may be serviced. In accordance with some embodiments, a module in need of service may be taken offline without taking surrounding membrane modules offline. In some embodiments, the module may be serviced without having to dismantle the components of adjacent membranes. The systems and assemblies of the present invention may enable a system to be serviced without taking a large portion of, or the entire system offline. The systems and assemblies of the present invention may facilitate an operator in servicing the system.

Figure 13:
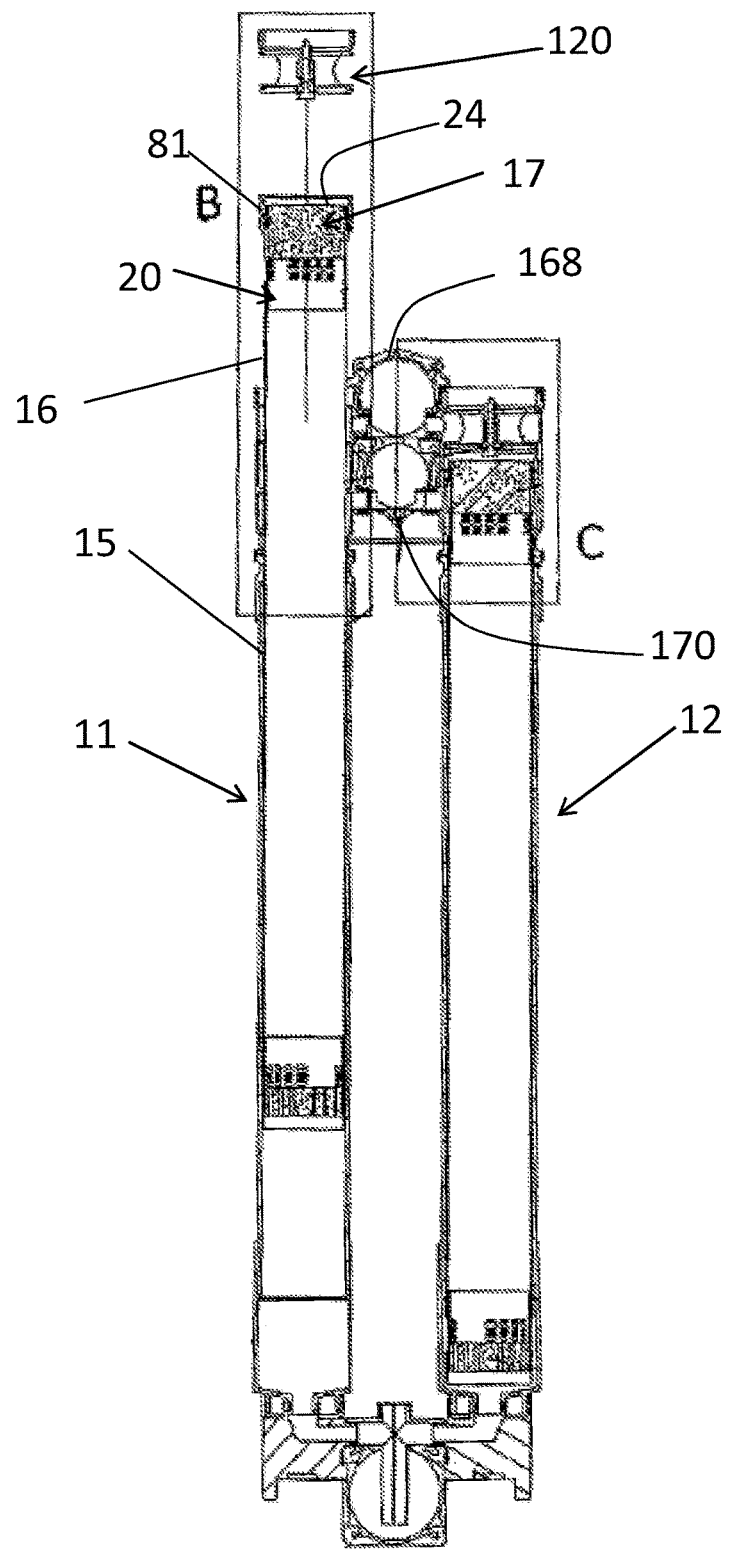
FIG. 13 is a schematic, partially exploded, cross-sectional elevation view of the pair of membrane modules of FIG. 1 according to an exemplary embodiment of the present invention.

In accordance with aspects and embodiments and referring to the filtration assembly shown in generally in FIGS. 1, 7, and 13, if the need arises to examine, test, remove or replace a membrane fiber bundle of a cartridge, or assess or service any other part of the membrane module, the module can be accessed without disturbing surrounding filtration modules. For example, if the membrane bundle contained within cartridge 16 in module 11 requires replacement, the bundle can be replaced without disturbing module 12.

End cap 120 of module 11 may be removed by unscrewing the end cap from upper header housing 30. As discussed, in some embodiments, end cap 120 may have threads positioned on the outer surface of the upper portion of end cap 120 that mate with complementary threads in upper header housing 30. In accordance with other embodiments, end cap 120 may be removed by pulling end-cap 120 vertically out of an unthreaded header housing 30, or may be removed by other means. As shown in FIGS. 5 and 13, displacement and removal of end cap 120 from upper housing header 30 exposes the distal, top surface 24 of potting head 17 located in annular adapter 81. Annular adapter 81 has inwardly extending lifting shoulder 139, which becomes accessible upon removal of end cap 120. A suitable tool may then be engaged with shoulder 139, and cartridge 16 can be withdrawn from module 11 by sliding the cartridge upward through outer casing 15 and out through the opening formed in the open-ended upper header housing 30. The membrane bundle may then be cleaned or replaced. Serviced cartridge 16 or a replacement cartridge may then be slid back into outer casing 15 of module 11. End cap 120 may then be replaced and re-engaged with cartridge 16 to mount cartridge 16 in upper housing header 30.

In accordance with aspects and embodiments of the present invention, filtration may be performed in a plurality of modes. Filtration may operate in dead end or feed and bleed modes, and in accordance with some aspects and embodiments, cleaning operations may be performed.

Referring to FIGS. 1-4, during normal feed supply mode filtration, feed passageway 60 and feed supply passageways 66 and 67 of the lower header 32 are full of feed liquid. Feed flows through feed passageway 60 through the lower open distal end 65 of conduit 61. Feed flows through passages 66 and 67 and branch output passageways 63 and 64 into fluid connection passageway 50 and out of fluid transfer port 45 of lower header 32. The feed liquid then flows into lower socket 31, along annular fluid transfer passageway 9, through the fluid communication region 21, through openings 22 in the lower potting sleeve 19 and around the membranes of each module 11 and 12. Feed may also flow upward through skirt 29, through passages 26, and the around the membranes.

In accordance with some embodiments, the filtration system may operate in dead end filtration mode. In dead-end filtration mode, the feed liquid is pressurized within the outer casing 15. The pressurization produces a transmembrane pressure differential across the walls of the membranes and feed is forced through the outer surface of the membranes. As a result, filtrate is produced within the membrane lumens. In some embodiments and in accordance with the dead-end filtration mode of operation, the membranes are not open in the lower potting head 18. Filtrate flows upward within the membrane lumens and is discharged into filtrate receiving chamber 135. Filtrate then flows through port 154 into filtrate discharge passageway 126, through filtrate transfer port 160 and into filtrate transfer manifold 168.

In accordance with other embodiments, the filtration system may operate in feed and bleed filtration mode. In feed and bleed filtration mode, a portion of feed liquid does not pass through the membranes to produce filtrate. In accordance with some feed and bleed embodiments, from about 10% of the feed liquid to about 75% of the feed liquid enters the base of each module and flows upward along the outside of the membranes. This portion of the feed then passes outward through opening 22 in upper potting sleeve 20 into annular fluid transfer passageway 104. The feed liquid then flows out through fluid transfer port 105 and into passageway 172 of the fluid transfer manifold 170. The remaining portion of the feed is filtered through the membranes and is collected from the membrane lumens as filtrate in filtrate collection chamber 135. The collected filtrate then flows through filtrate passageway 126 in end cap 120, through port 160, and into filtrate transfer manifold 168.

In accordance with some embodiments, the membranes in the filtration module assemblies and filtration systems of the present invention may be cleaned by a scouring or scrubbing process. When cleaning is desired, the liquid within feed passageway 60 is displaced downwardly by the introduction of gas into feed passageway 60 until the gas/liquid interface reaches the level of aeration openings 71 and 72. The gas then passes through openings 71 and 72, along passages 66 and 67 of conduit 61, and into the respective output passageways 63 and 64. The gas then passes from passageways 63 and 64 into fluid connection passageway 50, outward through fluid transfer port 45, and into the lower socket 31. The gas is then captured by skirt 29 and fed upwards through passages 26 in the lower potting head 18.

The gas then enters the base of each module and gas bubbles flow upward along the membranes and within the screen 80 cleaning the surface of the membranes. As the gas moves past the membrane fibers, the friction between the gas bubbles and contaminants lodged on the membrane surfaces may cause release of the contaminants from the membrane surfaces. The introduction of the gas may also cause the membrane fibers to vibrate and further dislodge contaminants. The gas then passes outward through openings 22 in the upper potting sleeve 20 and into annular fluid transfer passageway 104. The gas then vents through fluid transfer port 105 and into the passageway 171 of the fluid transfer manifold 170. In accordance with some embodiments, a single manifold 54 may be used to selectively supply feed and/or gas bubbles to a membrane module.

A backwash or draindown of the modules may be performed after gas aeration and cleaning. During a backwash or draindown, liquid may be removed from the module by flowing liquid in the reverse direction to that of the feed supply mode. A backwash, such as a reverse fluid flow, for example, flow of filtrate from the lumens through to the outer surfaces of the membranes, may further remove contaminants from the membranes by forcing liquid from the inside of the membranes out through the membrane pores. A drain down of the modules may remove dislodged contaminant waste from the module.

Figure 14:
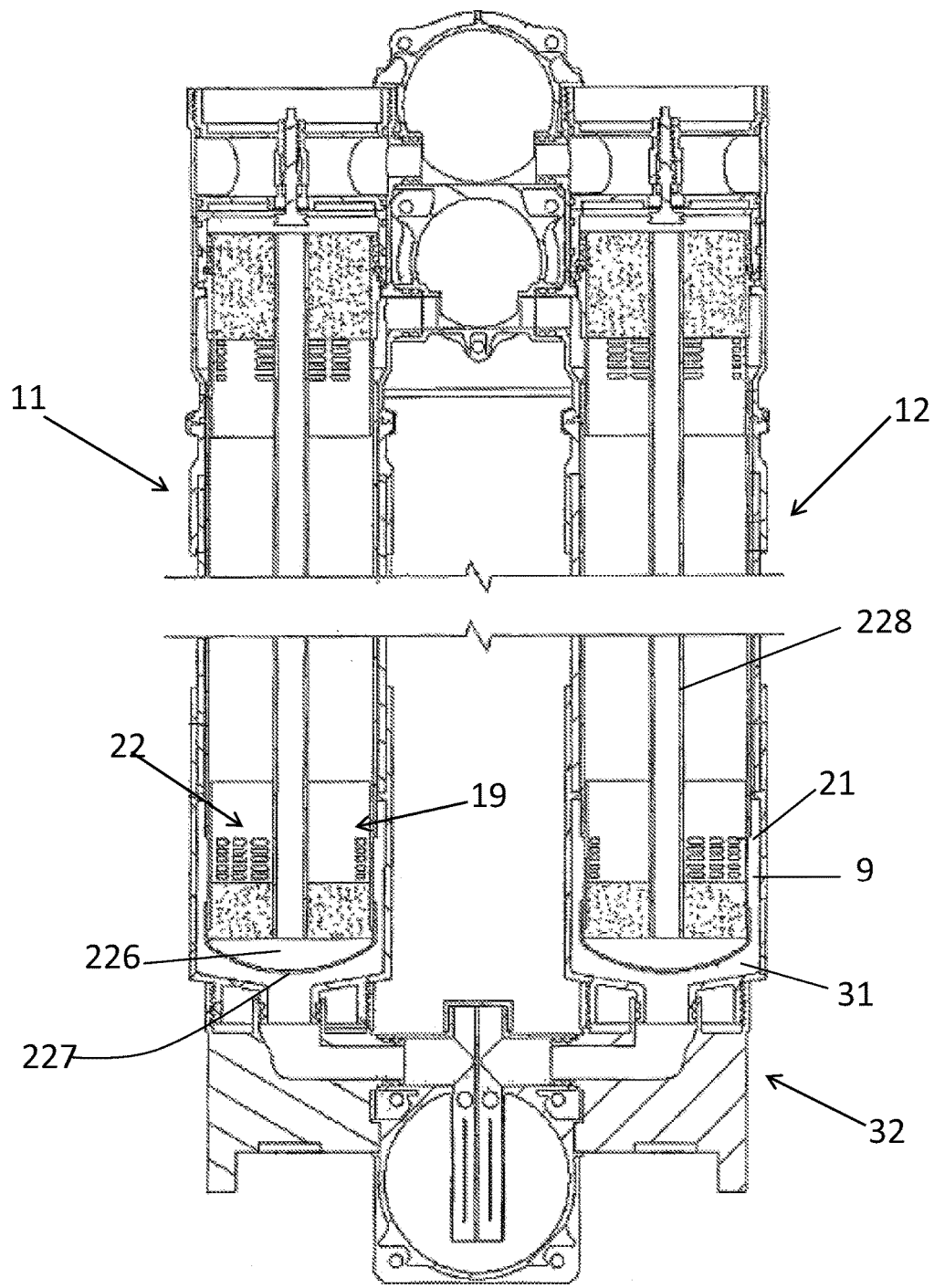
FIG. 14 is a broken schematic cross-sectional elevation view of a pair of membrane filtration modules according to an exemplary embodiment of the present invention.

In accordance with some embodiments, the membrane modules may be configured to withdraw filtrate from the bottom or both ends of the potted membranes. Referring to FIG. 14, a lower filtrate collection chamber 226 is formed by providing a collection cap 227 sealingly fitted to the lower end of the lower potting head 18. The membranes (not shown) potted in the lower potting head 18 have lumens opening into the lower filtrate collection chamber 226 at their ends. The lower filtrate collection chamber 226 is fluidly connected to the upper filtrate receiving chamber by a longitudinal conduit 228 extending therebetween. Conduit 228 may be located within the membrane bundle or may comprise any suitable fluid connection constructed and arranged to transfer filtrate between the collection chambers. To isolate the lower collection chamber from the feed side of the module, no through openings are provided in the lower potting head. Feed liquid or gas may flow from the lower header 32 into the lower socket 31, along annular fluid transfer passageway 9 through the fluid communication region 21, the openings 22 in the lower potting sleeve 19 and around the membranes of each module 11 and 12.

While exemplary embodiments of the disclosure have been disclosed, many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a heat exchanger system or water treatment system. It is, therefore, to be understood that the foregoing embodiments are presented by way of example only and that, within the scope of the appended claims and equivalents thereto, the disclosed systems and methods may be practiced otherwise than as specifically described. For example, flat sheet membranes may be prepared and used in the systems of the present disclosure. The present systems and methods are directed to each individual feature, system, or method described herein. In addition, any combination of two or more such features, systems, or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, the manifolds may be prepared by any fabrication technique, including injection molding or welding techniques and be fabricated from any desired material. In other instances, an existing facility may be modified to utilize or incorporate any one or more aspects of the invention. Thus, in some cases, the systems may involve connecting or configuring an existing facility to comprise a filtration system or components of a filtration system, for example the manifolds disclosed herein. Accordingly, the foregoing description and drawings are by way of example only. Further, the depictions in the drawings do not limit the disclosures to the particularly illustrated representations.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. A filtration system comprising:
   a first filtration module including a first fluid communication opening and a first header having a first removable end cap engaged with an upper end of the first header and a first filtration cartridge having an end disposed in a lower end of the first header;
   a second filtration module including a second fluid communication opening and a second header having a second removable end cap engaged with an upper end of the second header and a second filtration cartridge having an end disposed in a lower end of the second header;
   a first common fluid transfer manifold in fluid communication with the first fluid communication opening and the second fluid communication opening positioned between the first filtration module and the second filtration module;
   a second common fluid transfer manifold in fluid communication with the first and second filtration modules and disposed between and below the first and second filtration modules;
   an aeration control mechanism disposed within the second common fluid transfer manifold and including:
      a first conduit including a first aeration control aperture defined in a wall of the first conduit and in fluid communication with a lower end of the first filtration module; and
      a second conduit including a second aeration control aperture defined in a wall of the second conduit and in fluid communication with a lower end of the second filtration module.

2. The filtration system of claim 1, wherein the first common fluid transfer manifold is in fluid communication with lumens of membrane fibers included in the first filtration module and with lumens of membrane fibers included in the second filtration module.

3. The filtration system of claim 1 further comprising a third common fluid transfer manifold located between the first header and the second header, and in fluid communication with external surfaces of membrane fibers included in the first filtration module and with external surfaces of membrane fibers included in the second filtration module.

4. The filtration system of claim 1, wherein the first header includes an internal diameter greater than an external diameter of the first filtration cartridge and the second header includes an internal diameter greater than an external diameter of the second filtration cartridge.

5. The filtration system of claim 1, wherein one or more fluid communication openings defined in each of the first header and the second header are in fluid communication with both the first filtration cartridge and the second filtration cartridge.

6. The filtration system of claim 1, wherein the first removable end cap is engaged with the first header to define a filtrate collection chamber between the first removable end cap and the first filtration cartridge.

7. The filtration system of claim 6, wherein the first removable end cap includes a fluid communication passageway in fluid communication between the filtrate collection chamber and the first fluid communication opening.

8. The filtration system of claim 6, wherein the first removable end cap includes a shut-off passageway opening at a lower end of the first removable end cap.

9. The filtration system of claim 6, wherein the first removable end cap includes a shut-off valve including a seal configured to fluidly isolate the filtrate collection chamber from the fluid communication passageway.

10. The filtration system of claim 9, wherein a shut-off passageway extends from a lower wall to an upper wall of the first removable end cap.

11. The filtration system of claim 7, wherein the fluid communication passageway is partially defined by a concave wall of the first removable end cap.

12. The filtration system of claim 7, wherein a plurality of radially extending reinforcement ribs extend between upper and lower walls of the first removable end cap.

13. The filtration system of claim 1, configured and arranged to deliver feed to be filtered and gas from the second common fluid transfer manifold to outer surfaces of membranes in the first and second filtration modules.

* * * * *